Patented Sept. 5, 1933

1,925,217

UNITED STATES PATENT OFFICE 1,925,217

THIONAPHTHENE-INDOLE CONDENSATION VAT DYESTUFFS

Karl Thiess and Theodor Meissner, Frankfort-on-the-Main-Hochst, Werner Zerweck, Frankfort - on - the - Main - Fechenheim, and Ernst Runne, Frankfort - on - the - Main - Hochst, Germany, assignors to General Aniline Works, Inc., New York, N. Y., a corporation of Delaware No Drawing. Application April 5, 1929, Serial No. 352,910, and in Germany April 7, 1928

5 Claims. (Cl. 260—48)

The present invention relates to vat dyestuffs, more particularly to vat dyestuffs dyeing violet-blue to blue tints.

We have found that new vat dyestuffs, dyeing violet-blue to blue tints and being especially valuable for calico-printing, are obtained by condensing an alkoxy-isatin-α-compound of the following general formula:

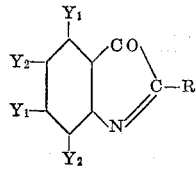

wherein $Y_1$ stands for hydrogen, halogen or an alkyl group, at least one $Y_1$ being halogen or alkyl, $Y_2$ for hydrogen, halogen or an alkoxy group, one $Y_2$ at least being an alkoxy group and R for halogen or an arylide residue, with a hydroxy-thionaphthene compound which may be substituted in the benzene nucleus by halogen or alkyl.

The condensation may be carried out by causing the components to act upon one another in the presence of a solvent such as chlorobenzene, benzene, nitrobenzene or the like. When using as the starting material a substituted alkoxy-isatin-α-arylide one may also use as the diluent alcohol, acetic anhydride or water. If required the reaction may be accelerated by moderately heating the mass.

The dyestuffs thus obtainable are compounds of the following general formula:

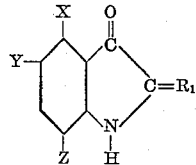

wherein X represents hydrogen, alkyl or halogen Y=hydrogen, alkoxy or halogen Z=alkoxy or halogen (only one alkoxy group, however, being contained in the indol nucleus) and $R_1$ represents a thionaphthene radical which contains halogen or alkyl as substituents forming valuable vat dyestuffs of very good fastness properties.

The following examples serve to illustrate our invention but they are not intended to limit it thereto, the parts being by weight.

(1) 19.9 parts of 5-chloro-7-methyl-3-hydroxy-1-thionaphthene are dissolved, while heating, in 200 parts of chlorobenzene. 19.1 parts of 4-methyl-7-methoxyisatin are transformed into the corresponding isatin-α-chloride by heating them with 22 parts of phosphorus pentachloride in 200 parts of chlorobenzene. After the two solutions have been combined, 5-chloro-7-methyl-(2)-thionaphthene -4'-methyl -7'- methoxy -(2') - indolindigo immediately separates in a crystalline form. After the product has been heated for a short time to about from 80° C. to 90° C. in order to complete the formation of the dyestuff, the 5-chloro -7- methyl-(2)-thionaphthene- 4'-methyl-7'-methoxy-(2')-indolindigo is filtered cold by suction and washed with alcohol for the purpose of removing the chlorobenzene.

The reaction may be illustrated by the following equation:

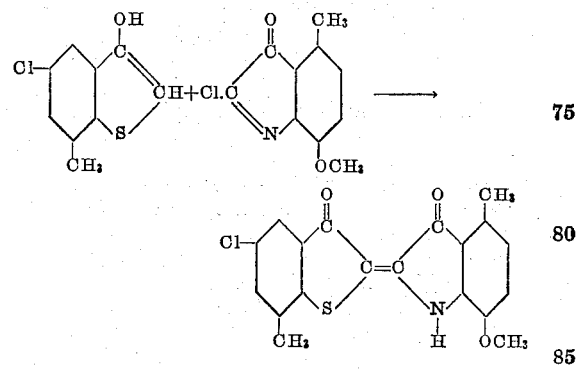

The dyestuff thus obtained dyes the fiber from a yellow vat dull greenish-blue tints.

(2) If in Example 1 the 4-methyl-7-methoxy-isatin is replaced by 22.6 parts of 4-methyl-5-chloro-7-methoxy-isatin and the further operations are carried out as described in Example 1, 5-chloro-7-methyl-(2)-thionaphthene-4'-methyl-5'-chlor-7'-methoxy-(2')-indolindigo is obtained. This dyestuff dyes the fiber from a golden yellow vat marine-blue tints of good fastness to washing, boiling and chlorine.

(3) 22.6 parts of 4-methyl-5-chloro-7-methoxy-isatin are transformed into the corresponding isatin-α-chloride by heating it with 22 parts of phosphorus pentachloride in 200 parts of chlorobenzene and introduced into a solution of 21.3 parts of 4.7-dimethyl-5-chloro-3-hydroxy-1-thionaphthene in 200 parts of chlorobenzene. The new dyestuff which separates from the solution is filtered and freed from the chlorobenzene by washing it with alcohol. The 4.7-dimethyl-5-chlor-(2)-thionaphthene- 4'-methyl -5'- chlor-7'-methoxy-(2')-indolindigo dyes the fiber from a golden-yellow vat blue tints of good fastness to washing, boiling and chlorine.

(4) By substituting in Example 3, 23.3 parts of 4-methyl-5.7-dichlor-3-hydroxy-1-thionaphthene for the 4.7-dimethyl-5-chlor-3-hydroxy-1-thionaphthene and performing the further working-process according to Example 3, 4-methyl-5.7-dichlor-(2)-thionaphthene-4'-methyl-5'-chlor-7'-methoxy-(2')-indolindigo is obtained. This dyestuff dyes the fiber from a yellow-olive vat clear blue tints of good fastness to washing, boiling and chlorine. The tint is more greenish than that of the dyestuffs obtained according to Examples 2 and 3.

(5) By substituting in Example 3 19.9 parts of 5-methyl-7-chlor-3-hydroxy-1-thionaphthene for the 4.7-dimethyl-5-chlor-3-hydroxy-thionaphthene and further working in the same manner as in Example 3, the 5-methyl-7-chlor-(2)-thionaphthene-4'-methyl-5'-chlor-7'-methoxy-(2')-indolindigo is obtained which dyes the fiber from a yellow vat a tint which is similar to that of the dyestuff of Example 4.

(6) By substituting in Example 3 18.5 parts of 5-chlor-3-hydroxy-1-thionaphthene for the 4.7-dimethyl-5-chlor-3-hydroxy-1-thionaphthene and otherwise working in the same manner as indicated in this example 5-chlor-2-thionaphthene-4'-methyl-5'-chlor-7'-methoxy-(2')-indolindigo is obtained. This dyestuff dyes the fiber from a yellow vat blue tints of good fastness properties. Its shade is somewhat greener than that of the dyestuff prepared according to Example 3.

(7) 21.2 parts of 5-methoxy-7-chlor-isatin dissolved in 200 parts of chlorobenzene are transformed in the usual manner into the corresponding isatin-α-chloride and mixed with a solution of 21.3 parts of 4.7-dimethyl-5-chlor-3-hydroxy-1-thionaphthene in 200 parts of chlorobenzene. The 4.7-dimethyl-5-chlor-(2)-thionaphthene-5'-methoxy-7'-chlor-(2')-indolindigo worked up in the usual manner dyes the fiber from a yellow vat blue tints of good fastness properties.

(8) 24 parts of 4-methyl-5-chlor-7-methoxy-isatin are transformed into the corresponding α-isatin-chloride by heating it in about 250 parts of chlorobenzene with 24 parts of phosphorus pentachloride. This solution is poured into another solution of 25 parts of 5.6.7-trichloro-3-hydroxy-1-thionaphthene in 250 parts of chlorobenzene and heating is continued for some time on the water bath until the condensation is complete. After cooling, the dyestuff which has been separated in the form of blue crystals is filtered by suction, washed with chlorobenzene and alcohol and dried. Thus a violet-blue powder is obtained which dissolves in concentrated surfuric acid to a bluish-green solution and dyes cotton from a reddish-yellow vat blue tints of very good fastness properties.

(9) 22 parts of 4-chlor-7-methoxy-isatin are transformed into the corresponding isatin-α-chloride by means of 24 parts of phosphorus pentachloride dissolved in 220 parts of chlorobenzene. Then a solution of 22 parts of 5.7-dichloro-3-hydroxy-1-thionaphthene in 220 parts of chlorobenzene is added and the mixture is heated for some further time on the water bath. The dyestuff separating in a crystalline form is filtered by suction, washed with chlorobenzene and alcohol and dried. The violet-blue powder thus obtained dissolves in concentrated sulfuric acid to a bright-blue solution and dyes the fiber from a yellow hydrosulfite vat fast marine-blue tints.

(10) A solution of 4-chlor-7-methoxy-isatin-α chloride, prepared as described in Example 9, is condensed with 23 parts of 4-methyl-5.7-dichlor-3-hydroxy-1-thionaphthene dissolved in 200 parts of chlorobenzene according to the processes described in the preceding examples. The dyestuff thus obtained forms a violet-blue powder which dissolves in concentrated surfuric acid to a greenish-blue solution. It dyes the fiber from a reddish-yellow vat fast marine-blue tints.

(11) When using in Example 10 instead of 4-methyl-5.7.dichlor-3-hydroxy-1-thionaphthene the corresponding quantity of 4.7-dimethyl-5-chlor-3-hydroxy-1-thionaphthene, 4.7-dimethyl-5-chloro-2-thionaphthene-4'-chloro-7'-methoxy-2'-indolindigo is obtained which is very similar to that of example 10 but which dyes the fiber more reddish-blue tints. It dissolves in concentrated surfuric acid to a bluish-green solution and yields a yellow vat.

(12) When substituting in Example 10 25 parts of 5.6.7-trichloro-3-hydroxy-1-thionaphthene for 4-methyl-5.7-dichlor-3-hydroxy-1-thionaphthene and otherwise working in the same manner as indicated in this example a dyestuff is obtained which dissolves in concentrated sulfuric acid to a bluish-green solution. Its hydrosulfite vat has an orange-yellow coloration. It dyes cotton pure-blue tints which have a more greenish hue than that of the dyestuff of Example 10.

(13) 22 parts of 4-chloro-7-methoxy-isatin are transformed into the corresponding isatin-α-chloride by heating with 24 parts of phosphorus pentachloride in 220 parts of chlorobenzene. The solution thus obtained is added to a solution of 18.5 parts of 5-chloro-3-hydroxy-1-thionaphthene in 200 parts of chlorobenzene. The formation of the dyestuff is completed by moderately heating on the water bath. After cooling, the dyestuff which has separated in the form of bluish-violet crystals is filtered by suction, washed with chlorobenzene and alcohol and dried. It dissolves in concentrated sulfuric acid to a greenish-blue solution and dyes cotton from a yellow hydrosulfite vat beautiful marine-blue tints.

(14) 22 parts of 5.7-dichloro-3-hydroxy-1-thionaphthene are dissolved, while boiling, in 180 parts of chlorobenzene and filtered. The filtered solution is introduced while stirring at from 40° C. to 50° C. into a solution of 4-methyl-5-chloro-7-methodxy-isatin-α-chloride prepared from 22.6 parts of this isatin derivative as described in Example 8. After a short boiling, the condensation is complete. The separated dyestuff is filtered by suction and washed with chlorobenzene and alcohol. It dissolves in anhydrous sulfuric acid to a greenish-blue solution, in hot nitrobenzene to a bright-blue solution. Cotton and wool are dyed from the alkaline hydrosulfite vat pure-blue tints. The dyeings are of a more greenish shade than that of the dyestuff of Example 2.

(15) By substituting in Example 14 30.8 parts of 5.7-dibromo-3-hydroxy-1-thionapthene for 5.7-dichloro-3-hydroxy-1-thionaphthene a dyestuff is obtained which yields somewhat more greenish and clearer dyeings.

(16) By substituting in Example 14 23 parts of 5-bromo-3-hydroxy-1-thionaphene for 5.7-dichloro-3-hydroxy-1-thionapthene, the resulting dyestuff yeilds somewhat more reddish dyeings than that obtained according to Example 14.

(17) 21.3 parts of 4.7-dimethyl-5-chloro-3-hydroxy-1-thionaphthene are dissolved while boiling in 180 parts of chlorobenzene and filtered.

The filtered solution is introduced while stirring at from 40° C. to 50° C. into a solution of 4-methyl-5-chloro-7-ethoxy - isatin - α - chloride prepared from 24 parts of the said isatin and 22 parts of phosphorus pentachloride in 200 parts of chlorobenzene. After a short heating the condensation is complete. The separated dyestuff is filtered by suction, washed first with chlorobenzene and then with alcohol.

The 4.7-dimethyl-5-chloro-(2)-thionaphthene-4'-methyl-5'-chloro-7'- ethoxy -(2') - indolindigo dissolves in concentrated sulfuric acid to a bluish-green solution, in hot nitrobenzene to a bright-blue one. It dyes the fiber from an olive vat blue tints of good fastness properties. The shade of the dyeings is more reddish than that of the dyestuff of Example 14.

(18) 22 parts of 5.7-dichloro-3-hydroxy-1- thionaphthene are made into a paste with 400 parts of water and into this suspension are introduced while stirring at 60° C. to 70° C. 30 parts of 4-methyl-5-chloro -7- methoxy - isatin - α - anilide made into a paste with about 250 ccm. of water. The formation of the dyestuff sets in at once while aniline is split off. Stirring is continued at from 60° C. to 70° C. until no 4-methyl-5-chloro-7-methoxy-isatin-α-anilide can any longer be detected; the mass is then filtered hot by suction, washed first with warm diluted caustic soda solution and then with hot water and finally the filtration residue is dried. The dyestuff is identical with that described in Example 14.

We claim:

1. As a new product, the compound of the following formula:

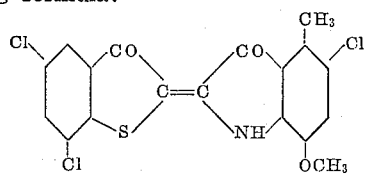

dissolving in concentrated sulfuric acid to a greenish-blue solution, in hot nitrobenzene to a bright-blue solution and dyeing cotton and wool from an alkaline hydrosulfite vat pure-blue tints.

2. As a new product, the compound of the following formula:

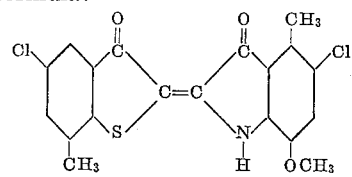

dyeing the fiber from a golden yellow vat navy-blue tints of good fastness to washing, boiling and chlorine.

3. As a new product, the compound of the following formula:

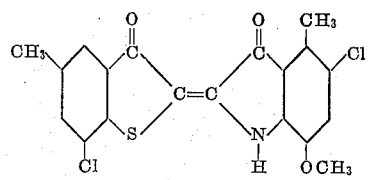

dyeing the fiber from a yellow vat clear blue tints.

4. As new products, the compounds of the following general formula:

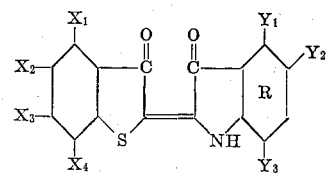

wherein $X_1$ stands for hydrogen or methyl, $X_2$ stands for chlorine, bromine or methyl, $X_3$ stands for chlorine, bromine or hydrogen, $X_4$ stands for chlorine, bromine, hydrogen or methyl, $Y_1$ stands for chlorine, bromine, methyl or hydrogen, $Y_2$ stands for hydrogen, chlorine, bromine or alkoxy, $Y_3$ stands for chlorine, bromine or alkoxy and wherein the nucleus R in any case contains one alkoxy group and further one methyl group or one halogen atom in the positions as defined herein, said dyestuffs yielding from a vat yellow-blue to blue tints.

5. As new products, the compounds of the following general formula:

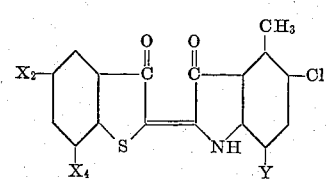

wherein $X_2$ stands for chlorine or methyl, $X_4$ stands for chlorine or methyl Y stands for methoxy or ethoxy, said dyestuffs yielding from a vat yellow-blue to blue tints.

KARL THIESS.
THEODOR MEISSNER.
WERNER ZERWECK.
ERNST RUNNE.